(12) United States Patent
Matsubara et al.

(10) Patent No.: US 11,777,427 B2
(45) Date of Patent: Oct. 3, 2023

(54) MOTOR CONTROL DEVICE AND AUTOMATIC ADJUSTMENT METHOD FOR SAME

(71) Applicant: Hitachi Industrial Equipment Systems Co., Ltd., Tokyo (JP)

(72) Inventors: Mitsuru Matsubara, Tokyo (JP); Kazuaki Tobari, Tokyo (JP); Yuuri Takano, Tokyo (JP); Yusuke Uei, Tokyo (JP); Tetsuo Yanada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/597,282

(22) PCT Filed: Jun. 9, 2020

(86) PCT No.: PCT/JP2020/022627
§ 371 (c)(1),
(2) Date: Dec. 30, 2021

(87) PCT Pub. No.: WO2021/106250
PCT Pub. Date: Jun. 3, 2021

(65) Prior Publication Data
US 2022/0321043 A1   Oct. 6, 2022

(30) Foreign Application Priority Data
Nov. 27, 2019 (JP) .................... 2019-213960

(51) Int. Cl.
  *G05B 5/00*    (2006.01)
  *H02P 21/05*   (2006.01)
  *H02P 23/04*   (2006.01)
(52) U.S. Cl.
  CPC .............. *H02P 21/05* (2013.01); *H02P 23/04* (2013.01)

(58) Field of Classification Search
  CPC ................................ H02P 21/05; H02P 23/04
  See application file for complete search history.

(56) References Cited

FOREIGN PATENT DOCUMENTS

| JP | 8-303285 A    | 11/1996 |
|----|---------------|---------|
| JP | 2004-274976 A | 9/2004  |

(Continued)

OTHER PUBLICATIONS

International Search Report (PCT/ISA/210) issued in PCT Application No. PCT/JP2020/022627 dated Sep. 15, 2020 with English translation (five (5) pages).

(Continued)

*Primary Examiner* — Karen Masih
(74) *Attorney, Agent, or Firm* — Crowell & Moring LLP

(57) ABSTRACT

An estimated value of frequency of a vibration component for automatically adjusting a control unit that suppresses resonance characteristics of a machine is stably and reliably estimated without depending on the magnitude of amplitude of the vibration component and without risk of arithmetic overflow. A motor control device including an automatic adjustment device that adaptively adjusts a controller included in a motor control system based on a frequency of a vibration component superimposed on a response of the motor control system, the automatic adjustment device including a vibration extraction unit that receives the response of the motor control system and extracts the vibration component from the response of the motor control system; a notch filter unit that receives the vibration component from the vibration extraction unit; an encoding unit; a limiter unit that receives an output of the notch filter unit; an adaptive updating unit; and a unit conversion unit.

14 Claims, 11 Drawing Sheets

(56) References Cited

FOREIGN PATENT DOCUMENTS

| JP | 2005-223960 A | | 8/2005 | |
|---|---|---|---|---|
| JP | 2009-165199 A | | 7/2009 | |
| JP | 2011-35967 A | | 2/2011 | |
| JP | 2012-120297 A | | 6/2012 | |
| JP | 2014-176291 A | | 9/2014 | |
| JP | WO 2019/138825 A1 | | 1/2021 | |
| JP | WO 2019/189646 A1 | | 4/2021 | |
| JP | 2021087276 A | * | 6/2021 | ............. H02P 21/05 |
| KR | 10-1062238 | | 9/2011 | |

OTHER PUBLICATIONS

Regalia, "Adaptive IIR Filtering in Signal Processing and Control," Marcel Dekker, Inc., Chapter 10, Adaptive Notch Filters, 1995, pp. 554-599 (24 pages).

Japanese-language Office Action issued in Japanese Application No. 2019-213960 dated Apr. 4, 2023 with English translation (nine (9) pages).

Japanese-language Written Opinion (PCT/ISA/237) issued in PCT Application No. PCT/JP2020/022627 dated Sep. 15, 2020 (five (5) pages). relevance to document B1 and B2.

Corresponding Korean Office Action issued in Korean Application No. 10-2021-7037331 dated Jul. 20, 2023 with English Translation (13 pages).

\* cited by examiner

F I G. 5
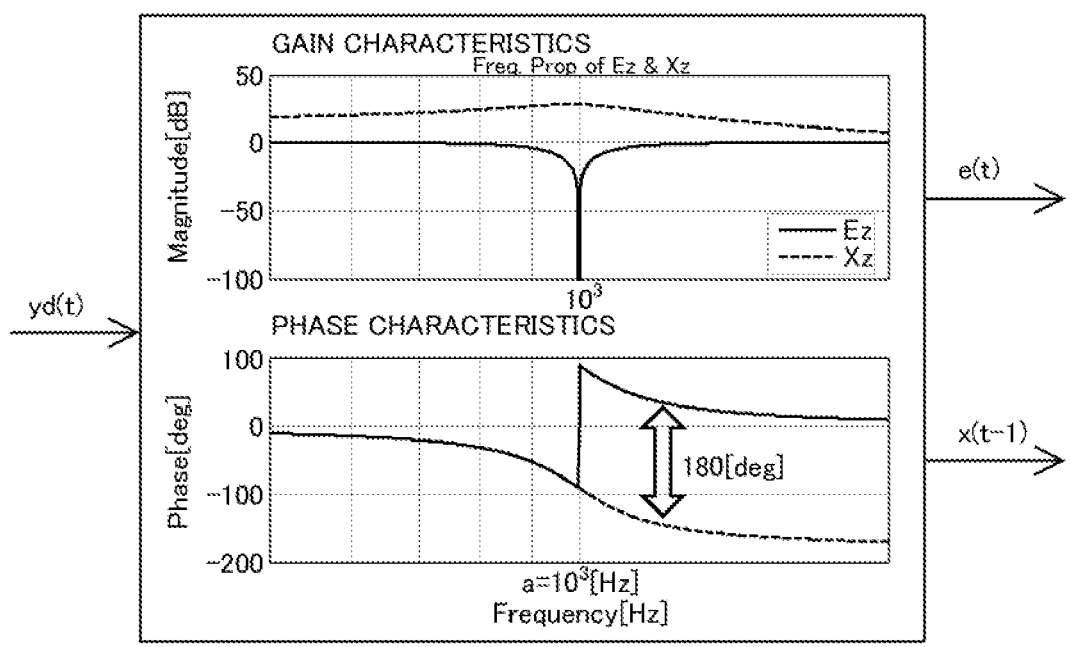
F I G. 6
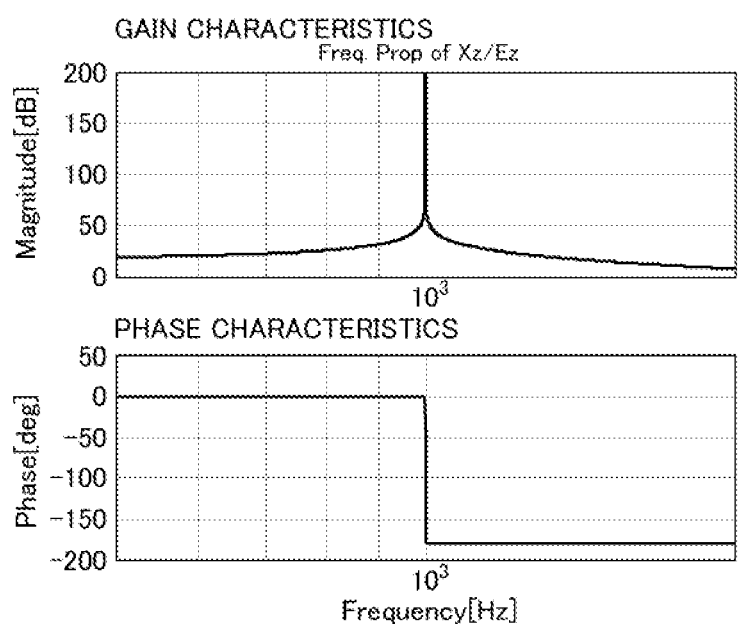

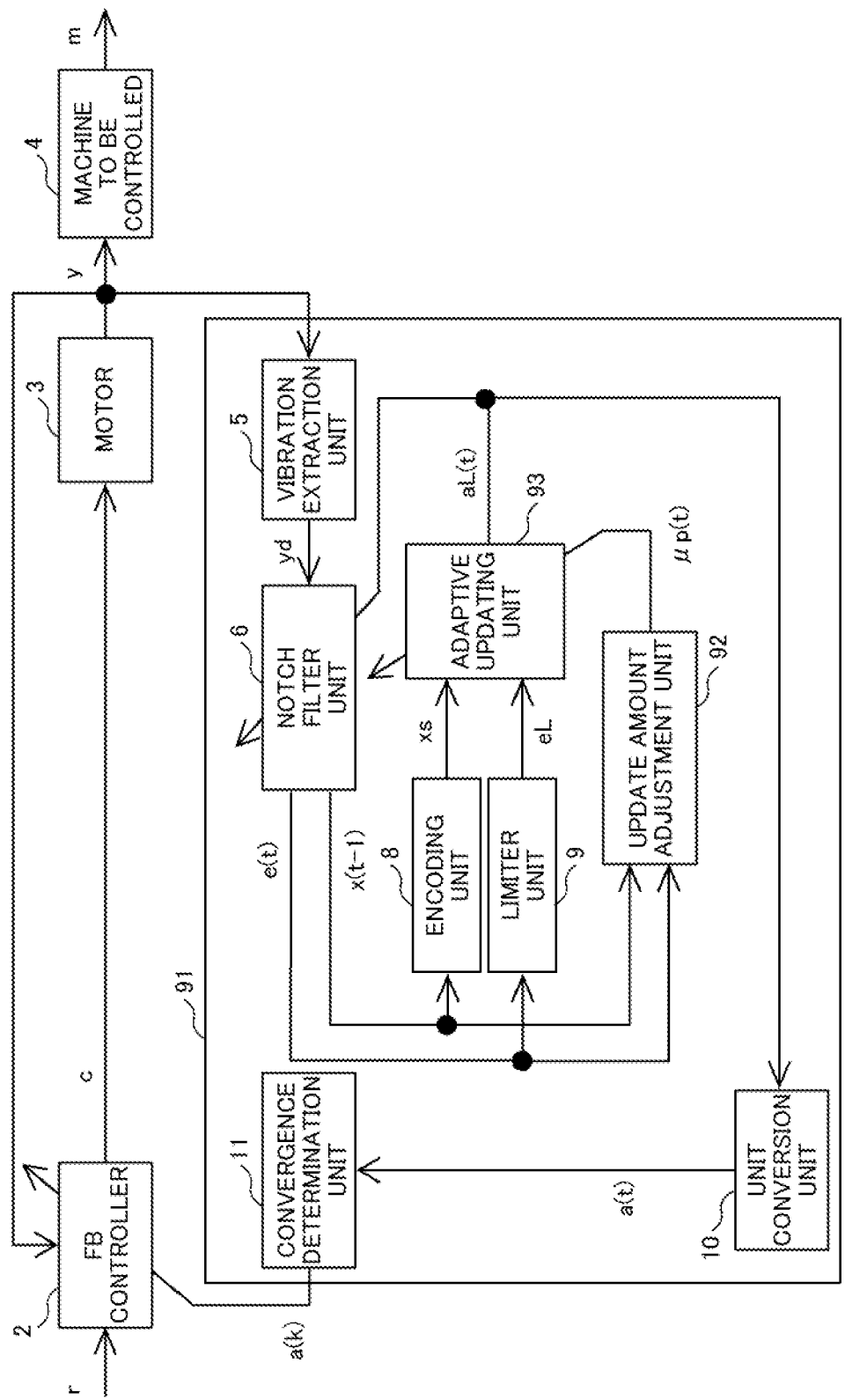
F I G. 1 2

MOTOR CONTROL DEVICE AND AUTOMATIC ADJUSTMENT METHOD FOR SAME

TECHNICAL FIELD

The present invention relates to a motor control device and an automatic adjustment method for the motor control device.

BACKGROUND ART

In a motor control system that controls a machine to be controlled, a motor end and a machine end may become vibrating due to the resonance characteristics of the machine, and desired response characteristics may not be realized. In such a case, measures such as using a notch filter in a latter stage of the controller, processing control commands are effective, but in order to achieve the measures, it is necessary to understand the resonance characteristics of the machine.

In an FA field, it is necessary to adjust the motor control system when introducing the motor control system or after maintenance of the machine to be controlled, but there is a need to shorten an adjustment time and improve productivity. Also, there is another need to minimize human cost for adjustment. Against the above background, in recent years, in the FA field, short-time or real-time automatic adjustment technology for motor control systems has been required.

When the desired response characteristics cannot be obtained due to the resonance characteristics of the machine, in order to automatically adjust in a short time a control unit (notch filter, and so on) that functions to suppress the resonance characteristics, there is a need to grasp and identify the resonance characteristics of the machine in a short time and automatically.

PTL 1 has been proposed as a technique for automatically grasping the resonance frequency, which is one of the resonance characteristics of the machine, in a short time. Further, NPL 1 has been proposed as a unit for sequentially estimating a frequency of a sinusoidal signal from a signal whose main component is the sinusoidal signal.

The technique of PTL 1 is shown in FIG. 14. In PTL 1, a method is proposed, in which in a control system in which a motor 109 connected to a load 110 is controlled by a speed control unit 101 and a torque control unit 103, a first notch filter 102 is provided after the speed control unit 101, and a notch frequency of the first notch filter 102 is automatically adjusted to suppress the vibration of the speed response (motor rotation speed) at a motor end detected by a speed detection unit 108.

In the method of automatically adjusting the notch frequency of PTL 1, the vibration component is extracted from a rotation speed of the motor by a high-pass filter 104. A signal whose vibration component has been processed by using a second notch filter 106 prepared separately from the first notch filter and a signal whose vibration component has been processed by a directional filter 105 are multiplied by a notch filter coefficient correction unit 107, the frequency of the vibration component is sequentially updated and estimated based on the multiplication result, and the updated and estimated frequency is applied as the notch frequency to the first notch filter 102. The processing from Y to W for estimating the frequency of the vibration component shown in FIG. 14 can be interpreted as a form of an adaptive notch filter.

NPL 1 proposes a discrete IIR (Infinite Impulse Response) type adaptive notch filter algorithm with simple calculation.

CITATION LIST

Patent Literature

PTL 1: Japanese Unexamined Patent Application Publication No. 2004-274976

Non-Patent Literature

NPL 1: Adaptive IIR Filtering In Signal Processing and Control, MARCEL DEKKER, INC., 1995, PP. 554-599.

SUMMARY OF INVENTION

Technical Problem

However, in PTL 1, there is a problem that when the frequency of the vibration component is sequentially updated and estimated, each calculation of the second notch filter 106 and the directional filter 105 is required, which is not excellent in the calculation cost. When executing the sequential update, there is a problem that the amount of update (the amount of each update) depends on the magnitude of the amplitude of the vibration component, and an estimated value of the frequency of the vibration component obtained by the sequential update does not converge stably, or it takes time to converge. Furthermore, even if the estimated value of the vibration component obtained by the sequential update does not converge stably and the reliability is low as the estimated value, the estimated value of the vibration component may be applied as the notch frequency to the first notch filter, and the effect of the vibration suppression may not be exhibited.

In the algorithm of NPL 1, when a normalization process is realized by an inexpensive arithmetic unit that performs fixed-point arithmetic, the lower the notch frequency, the more an arithmetic overflow may occur in the normalization process, which causes a problem that sequential update cannot be performed correctly (sequential update process breaks down).

The present invention has been made in view of the problem described above, and an object of the present invention is to provide a motor control device that is capable of performing sequential update and estimation without depending on the magnitude of an amplitude of a vibration component, with stability and high reliability, and without any risk of arithmetic overflow even in an inexpensive arithmetic device that performs fixed-point arithmetic for an estimated value of a frequency of the vibration component, which is required to automatically adjust a control unit for suppressing a resonance characteristic of a machine, and an automatic adjusting method for the motor control device.

Solution to Problem

An example of the "motor control device" according to the present invention for solving the above problems will be described.

A motor control device including an automatic adjustment device that adaptively adjusts a controller included in a motor control system based on a frequency of a vibration component superimposed on a response of the motor control system, the automatic adjustment device including: a vibration extraction unit that receives the response of the motor control system and extracts the vibration component from the response of the motor control system; a notch filter unit that receives the vibration component extracted by the vibration extraction unit; an encoding unit that receives an internal state quantity of the notch filter unit calculated by the notch filter unit; a limiter unit that receives an output of the notch filter unit calculated by the notch filter unit; an adaptive updating unit that receives an output of the encoding unit and an output of the limiter unit; and a unit conversion unit that receives an output of the adaptive updating unit, in which the encoding unit extracts and outputs only sign information of the internal state quantity, and outputs the sign information, the limiter unit calculates and outputs information that limits an output amplitude of the notch filter unit, the adaptive updating unit sequentially updates and outputs an estimated value of a notch frequency, which is a filter parameter of the notch filter unit, based on a product of the output of the encoding unit and the output of the limiter unit, the notch filter unit sequentially uses the estimated value sequentially calculated and output by the adaptive updating unit as the notch frequency, the unit conversion unit converts a unit of the estimated value sequentially calculated by the adaptive updating unit into hertz and outputs the converted value as an estimated value, and the automatic adjustment device adaptively adjusts the controller included in the motor control system by using the estimated value.

Advantageous Effects of Invention

According to the present invention, the internal state quantity of the notch filter unit calculated by the notch filter unit is processed by the encoding unit, and the output of the notch filter unit is processed by the limiter unit, thereby eliminating the need for the normalization process and further a convergence determination unit is employed, thereby making it possible to sequentially update and estimate the frequency of the vibration component with high reliability while avoiding the arithmetic overflow, and the controller can be automatically adjusted in a short time.

BRIEF DESCRIPTION OF DRAWINGS

FIG. 5 is a diagram showing the frequency characteristics of the adaptive notch filter shown in FIG. 4.

FIG. 6 is a diagram showing the frequency characteristics of Xz/Ez.

FIG. 12 is a diagram showing a basic configuration of a motor control device according to Example 2.

DESCRIPTION OF EMBODIMENTS

Hereinafter, examples to which the present invention is applied will be described with reference to the drawings.

In each figure, the same number is assigned to the components having a common function, and a duplicated description will be omitted. In addition, "feedback" may be abbreviated as "FB" and "notch filter" may be abbreviated as "NF", "low-pass filter" may be abbreviated as "LPF", "high-pass filter" may be abbreviated as "HPF", and "band-pass filter" may be abbreviated as "BPF".

Example 1

Figure 1:
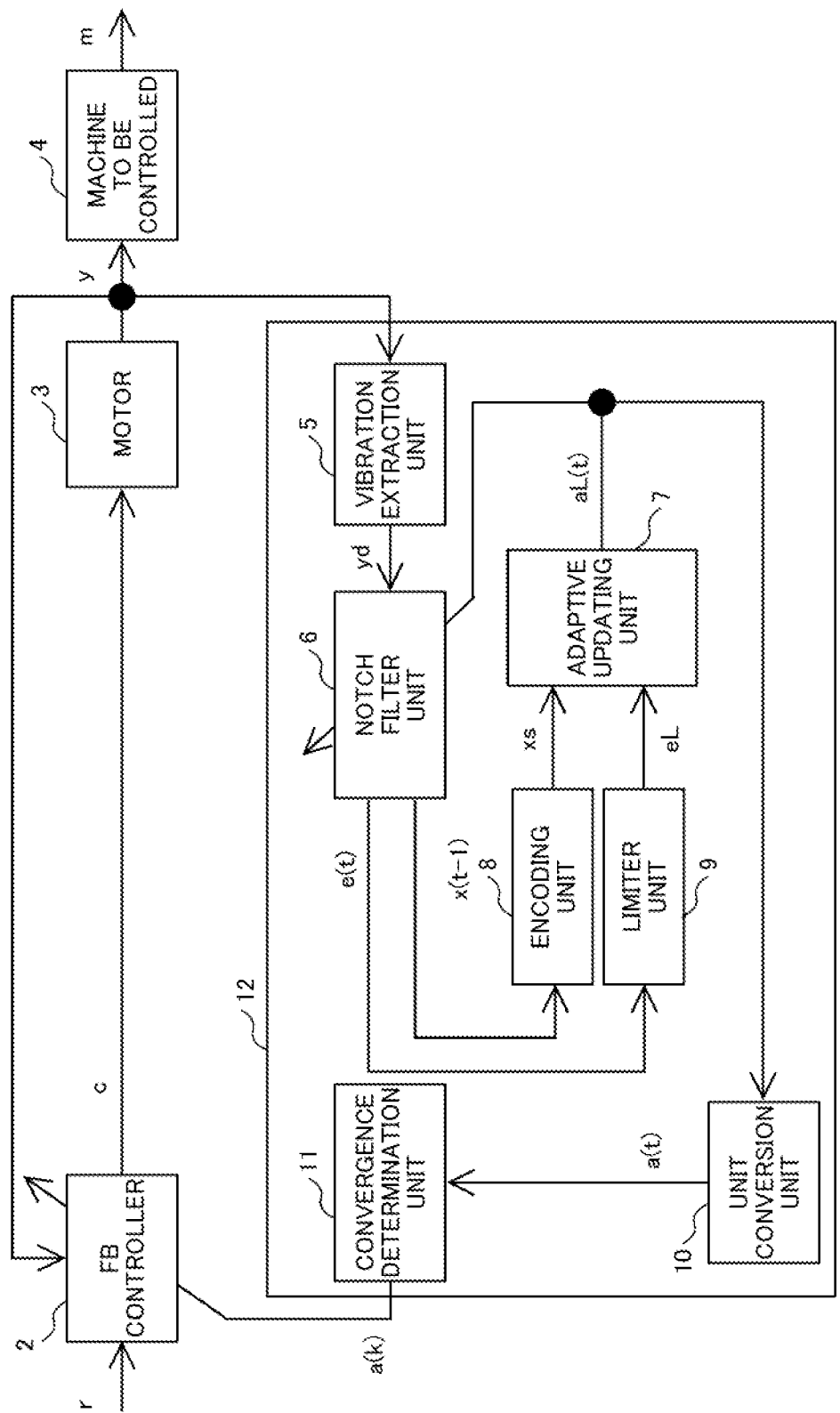
FIG. 1 is a diagram showing a basic configuration of a motor control device according to Example 1.

FIG. 1 shows a configuration in which an automatic adjustment device 12 according to Example 1 of the present invention is applied to an FB control system of a general motor.

An operation amount c of an FB controller 2 is given to a motor 3, and a machine 4 to be controlled is driven and controlled by an output y of the motor 3. For the sake of simplicity, the description of a current control system is omitted in FIG. 1.

The output y is a motor rotation speed [rpm], which is measured by using a sensor (for example, an encoder), and the FB controller 2 calculates the operation amount c based on a measured value of the output y and a rotation speed command r, and outputs the operation amount c to the motor 3.

In the FB control system shown in FIG. 1, the FB controller 2 includes a unit that grasps a frequency of the vibration component of the output y to suppress the vibration component of the output y when the output y becomes vibrating (that is, when a motor end becomes vibrating), or a unit that grasps the frequency of the vibration component of the output y to suppress a vibration component of an output m of the machine 4 to be controlled when the output y becomes vibrating.

The automatic adjustment device 12 grasps and estimates the frequency of the vibration component of the output y, and automatically adjusts a unit that suppresses the vibration component of the output y provided in the FB controller 2 or a unit that suppresses the vibration component of the output m of the machine 4 to be controlled provided in the FB controller 2, based on the estimated value of the frequency of the vibration component.

As an example of the FB controller 2 provided with the unit that suppresses the vibration component of the output y, there is an FB controller 21 shown in FIG. 2, including a notch filter (hereinafter, referred to as a "real notch filter") in the FB control loop.

Figure 2:
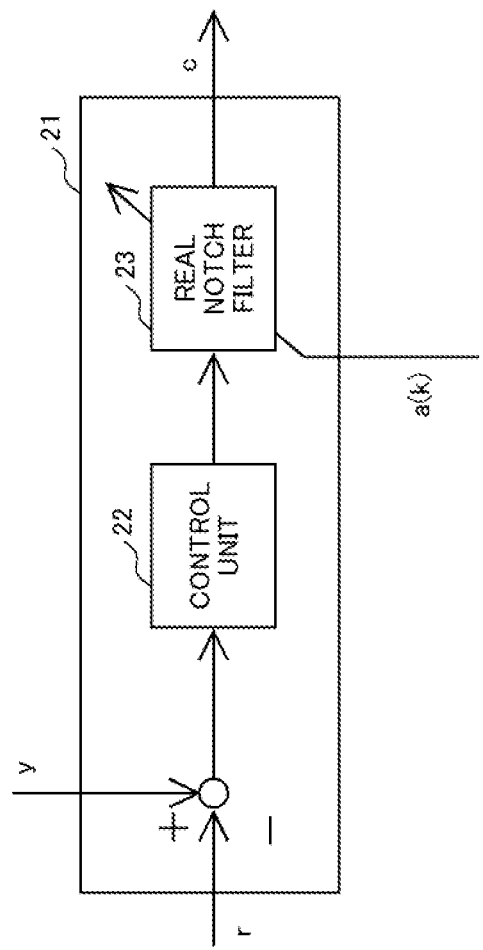
FIG. 2 is a diagram showing an example of an FB controller.

In FIG. 2, the FB controller 21 suppresses the vibration when an object to be controlled has a resonance characteristic and the motor end vibrates due to the resonance characteristic. Specifically, the notch frequency of the actual notch filter 23 is set to match the resonance frequency of the object to be controlled, so that a zero point of the actual notch filter 23 cancels a resonance pole of the resonance characteristic, and the FB controller 21 suppresses the vibration.

In this example, the FB controller 21 needs to accurately grasp the resonance frequency of the object to be controlled in order to suppress the vibration.

The automatic adjustment device 12 according to the present invention can automatically adjust the FB controller (specifically, the actual notch filter 23) as shown in FIG. 2 by estimating the frequency of the vibration component at the motor end, and suppresses the vibration of the motor end.

Figure 3:
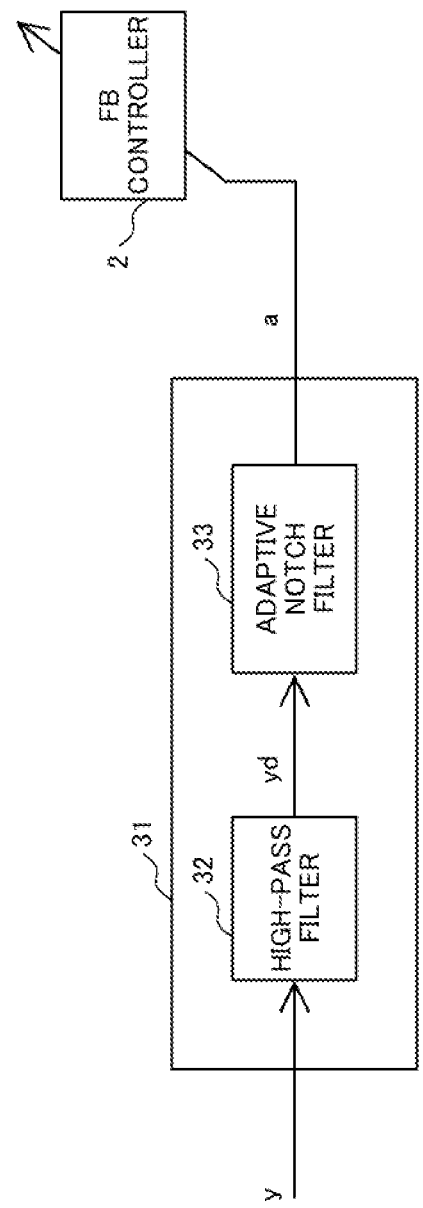
FIG. 3 is a diagram showing an example of an automatic adjustment device.

As a unit for realizing the automatic adjustment device 12, an automatic adjustment device 31 shown in FIG. 3 can be proposed. Specifically, the automatic adjustment device 31 includes an HPF 32 and an adaptive notch filter (ANF) 33. The HPF 32 is applied to the output y to extract a vibration component yd, the ANF 33 is applied to yd, and an estimated value a (where unit is [Hz]) of the notch frequency calculated by the ANF 33 is output from the automatic adjustment device 31.

Figure 4:
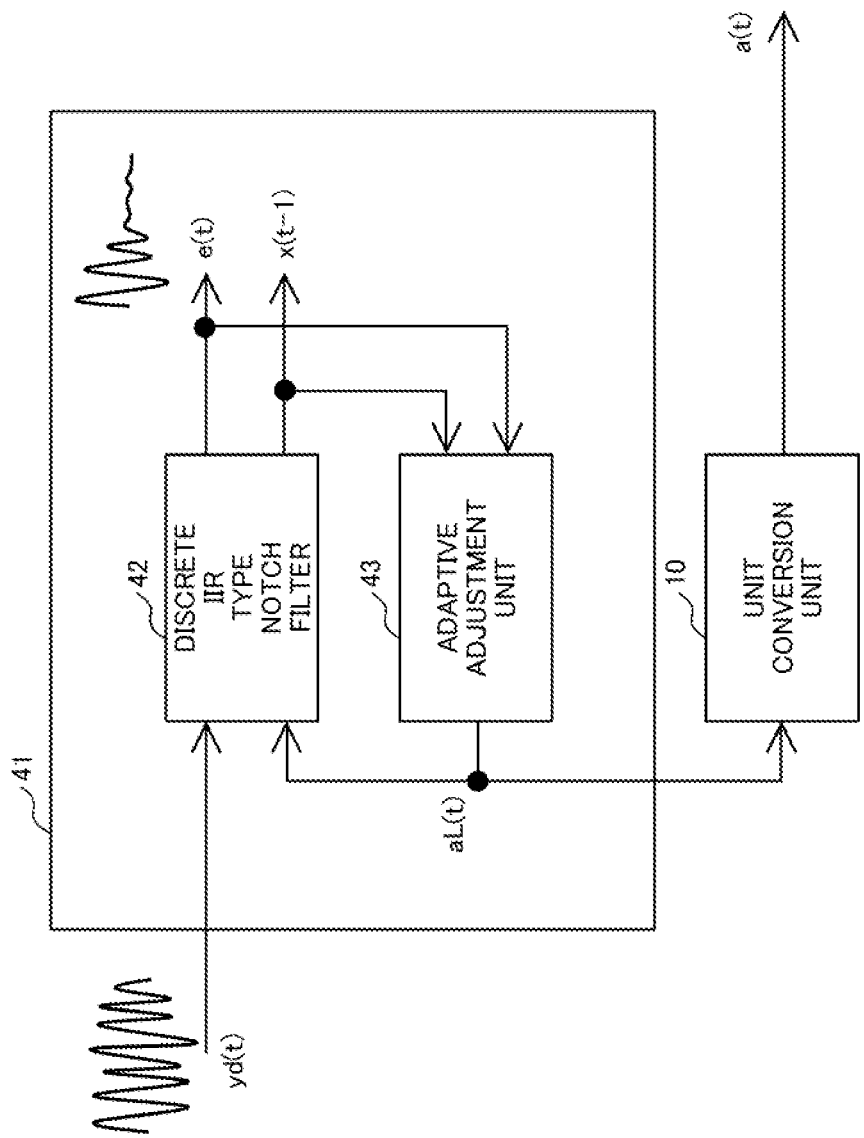
FIG. 4 is a diagram showing an example of an adaptive notch filter.

As an example of the ANF 33, FIG. 4 and the following description show a discrete IIR type ANF that has the same capability as that disclosed in NPL 1 and can be realized by simple processing.

In this example, an ANF 41 includes a discrete IIR (Infinite Impulse Response) type notch filter 42 of a lattice form shown in Expression (1) and an adaptive adjustment unit 43 according to Expressions (2) and (3). The ANF 41 receives a vibration component yd(t) and outputs an estimated value aL(t) of a frequency of the vibration component yd(t) at a time t. A unit conversion unit 10 of Expression (4) is a process for only converting the unit of the estimated value aL(t) to [Hz], and is not directly related to an estimation performance of aL(t) of the ANF 41.

<Discrete IIR Type Notch Filter 42>

[Expression 1]

$$\begin{bmatrix} x(t-1) \\ x(t) \end{bmatrix} = \begin{bmatrix} 0 & 1 \\ -r & -a_L(t)\cdot(1+r) \end{bmatrix}\begin{bmatrix} x(t-2) \\ x(t-1) \end{bmatrix} + \begin{bmatrix} 0 \\ 1 \end{bmatrix} y_d(t) \quad (1)$$

$$e(t) = (1-r)[1 \ a_L(t)]\begin{bmatrix} x(t-2) \\ x(t-1) \end{bmatrix} + y_d(t)$$

<Adaptive Adjustment Unit 43>

[Expression 2]

$$a_L(t+1) = a_L(t) - \frac{\mu}{\sigma_x^2(t)} e(t)x(t-1) \quad (2)$$

[Expression 3]

$$\sigma_x^2(t) = \lambda \sigma_x^2(t-1) + (1-\lambda)x^2(t) \quad (3)$$

<Unit Conversion Unit 10>

[Expression 4]

$$a(t) = \arccos(-a_L(t))/(2\pi T_s) \quad (4)$$

In this example, Expression (1) is a state space representation in which a transposed version of [x(t−2) x(t−1)] is a state vector, x(t) is an internal state quantity calculated by the discrete IIR type notch filter 42, and e(t) is an output calculated by the discrete IIR type notch filter 42. In addition, μ, λ, r, Ts, and $\sigma_x^2(t)$ are an update step adjustment coefficient, a forgetfulness coefficient, a notch width of Expression (1), a sample period, and an estimated value of the dispersion of x at the time t, respectively, all of which are positive values.

The frequency of the vibration component is estimated by sequentially updating aL(t) in Expression (2), and the amount of update of aL(t) at the time t is given by a second term on a right side of Expression (2). The second term on the right side of Expression (2) is configured based on a product of the internal state quantity x(t−1) of the discrete IIR type NF 42 of Expression (1) and the output e(t) of the discrete IIR type NF 42, and the positive and negative of the update amount of aL(t) are determined by e(t)·x(t−1). In the ANF 41, the internal state quantity x(t−1) obtained by the operation of the discrete IIR type NF 42 in Expression (1) is used for the sequential update of the estimated value, and it is not necessary to separately provide a filter corresponding to the directional filter 105 of the PTL 1, so that the calculation cost associated with the calculation of x(t−1) can be reduced.

Expression (3) is to perform a normalization process, which makes the sequential update of aL(t) by Expression (2) stable and smooth, and also eliminate the dependency of the magnitude of the amplitude of the input vibration component yd(t) on the amount of update (the second term on the right side of Expression (2)). e(t)·x(t−1) is divided by $\sigma_x^2(t)$ obtained by Expression (3) to perform the normalization process.

That the negative and positive of the amount of update are determined according to e(t)·x(t−1) and that Expression (3) effectively functions as the normalization process will be described in detail.

FIG. 5 shows the transmission characteristics Ez from yd(t) to e(t) and the frequency characteristics (Bode diagram) of transmission characteristics Xz from yd(t) to x(t−1) in the discrete IIR type notch filter. In the figure, a solid line indicates Ez, a broken line indicates Xz, and a is obtained by converting the unit of aL in Expression (1) to [Hz]. In FIG. 5, a=1000 [Hz].

Now, the vibration component yd(t) is expressed by the sum of a sine wave and noise as shown in the following expression.

[Expression 5]

$$y_d(t) = A\sin(2\pi \cdot f_d \cdot t) + v(t), \ A > 0 \quad (5)$$

However, A and fd are the amplitude and frequency [Hz] of the sine wave, respectively, and for simplification, v(t) is a white noise of an average 0 and a variance σv² (where A>>σv²).

Focusing on phase characteristics in FIG. 5, it is found that the phase characteristics of Ez and Xz are exactly the same in a region smaller than a frequency a [Hz], and in a region larger than the frequency a, the phase characteristics of Ez are equivalent to characteristics in which the phase characteristics of Xz are advanced by 180 [deg].

Now, for the sake of simplicity, v(t)=0 is assumed, and the cases where a frequency fd of the sine wave of yd(t) satisfies (i) fd<a and (ii) fd>a will be considered.

A purpose of the ANF 41 is to match a with fd, that is, to estimate the frequency fd of the vibration component. To achieve the estimation, a may be reduced if the relationship of (i) is satisfied, and a may be increased if the relationship (ii) is satisfied. The increase or decrease (positive or negative) of the update of a can be determined based on e(t)·x(t−1). Specifically, according to the relationship between Ez and Xz shown in FIG. 5, in the case of (i), e(t) and x(t−1) with respect to yd(t) are in phase, so that e(t)·x(t−1) is always positive. In the case of (ii), e(t) and x(t−1) with respect to yd(t) are out of phase, so that e(t)·x(t−1) is always negative. In Expression (2), the above features are used in the determination of the increase or decrease (positive or negative) of the update of a.

The relationship between e(t) and x(t−1) can be expressed by the following expression.

[Expression 6]

$$x(t-1) = \begin{cases} \alpha_x(f_d, a) \cdot e(t), & f_d < a \\ -\alpha_x(f_d, a) \cdot e(t), & f_d > a \end{cases}, \alpha_x(f_d, a) \geq 0 \quad (6)$$

αx is a constant corresponding to a gain of the transmission characteristics Xz/Ez when the frequency of the vibration component is fd [Hz] and the notch frequency of Expression (1) is a [Hz]. FIG. 6 shows the frequency characteristics of the transmission characteristics Xz/Ez.

Note that αx fluctuates as the relationship between fd and a changes, and is irrelevant to the amplitude A of the vibration component yd(t), the amplitude of e(t), and the amplitude of x(t−1). Also, note that the higher the frequency of fluctuation in fd or a associated with the sequential update of the ANF 41 is, the higher the frequency of fluctuations in αx is.

Expression (6) is substituted into Expression (3) and rearranged to obtain the following expression.

[Expression 7]

$$\sigma_x^2(t) = \frac{(1-\lambda)z^{-1}}{1-\lambda z^{-1}} \cdot z \cdot x^2(t) = \frac{(1-\lambda)z^{-1}}{1-\lambda z^{-1}} \cdot x^2(t-1) \quad (7)$$
$$= \frac{(1-\lambda)z^{-1}}{1-\lambda z^{-1}} \cdot \alpha_x^2(f_d, a) \cdot e^2(t)$$

However, z is a z operator in the z-transform.

Furthermore, when Expressions (6) and (7) are substituted into Expression (2) and rearranged, the amount of update of the second term on the right side of Expression (2) can be written as the following expression.

[Expression 8]

$$\frac{\mu}{\sigma_x^2(t)}e(t)x(t-1) = \begin{cases} \mu \cdot (LPF(\lambda) \cdot \alpha_x(f_d, a))^{-1}, & f_d < a \\ -\mu \cdot (LPF(\lambda) \cdot \alpha_x(f_d, a))^{-1}, & f_d > a \end{cases} \quad (8)$$
$$LPF(\lambda) \equiv \frac{(1-\lambda)z^{-1}}{1-\lambda z^{-1}}, f_c \equiv -\log(\lambda)/(2\pi T_s)$$

Expression (8) shows that the amount of update is determined based on αx regardless of the magnitude of the amplitude of yd(t), e(t), and x(t−1). Also, an LPF(λ) is a low-pass filter of a discrete first-order lag system with a cutoff frequency of fc [Hz]. For example, when λ=0.99 and Ts=100 [μs], the cutoff frequency of the LPF(λ) is fc≈16 [Hz]. In the sequential update of the ANF 41, even if the frequency of αx fluctuation becomes high due to the influence of noise v, for example, the LPF(λ) removes the high frequency component of αx fluctuation. Therefore, the high frequency component is removed from the fluctuation of the amount of update in Expression (8), and a change in aL due to the sequential update shown in Expression (2) is smooth.

According to the frequency characteristics of the transmission characteristics Xz/Ez shown in FIG. 6, the closer fc is to a, the larger the value of αx. Therefore, the amount of update shown in Expression (8) becomes smaller as fc is closer to a. The convergence of a to a true value fd becomes stable.

From the above description, it is found that the ANF 41 shown in Expressions (1) to (3) has such advantages that the sequential update of aL shown in Expression (2) is stable and smooth, independent of the amplitude of the vibration component according to Expression (3).

However, when the ANF 41 of Expressions (1) to (3) is implemented in the arithmetic unit that performs fixed-point arithmetic, an arithmetic overflow may occur especially in the arithmetic of Expression (3), and the sequential update of aL in Expression (2) may break down. This becomes more noticeable as the frequency of the vibration component yd to be estimated is lower.

The reason will be described below.

Figure 7:
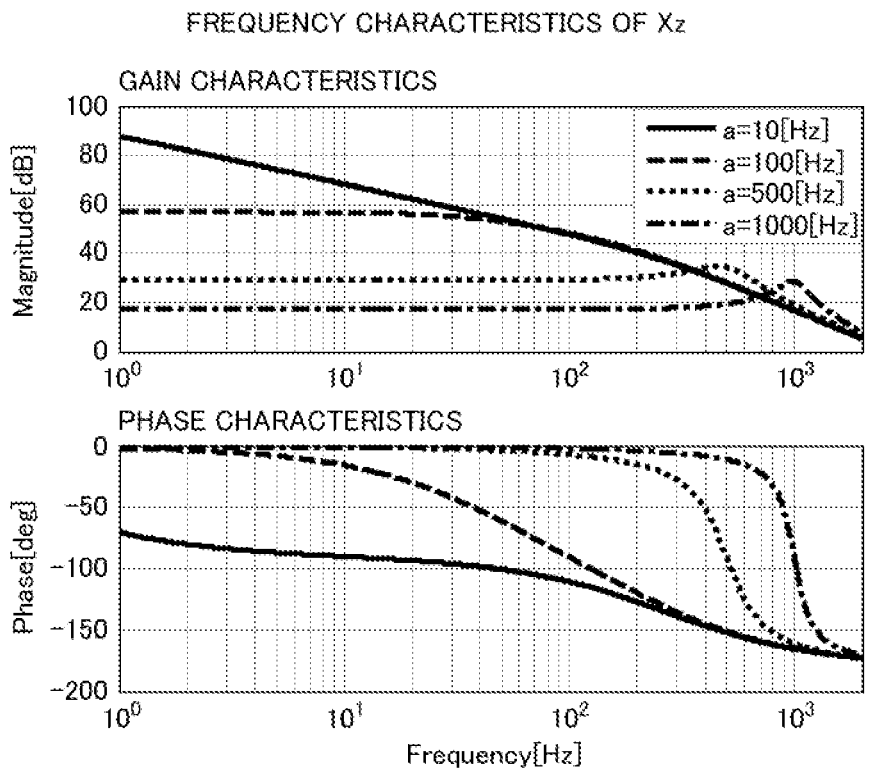
FIG. 7 is a diagram showing the frequency characteristics of Xz.

FIG. 7 shows the frequency characteristics of Xz of the notch filter shown in Expression (1) when aL is changed. It is found that a gain tends to increase significantly in a frequency band around aL and equal to or lower than aL as aL becomes lower. That is, as the aL is lower, x(t−1) required to update aL tends to increase significantly. Therefore, when the number of bits used for the fixed-point arithmetic is not sufficient, an arithmetic overflow may occur when calculating x(t−1).

In order to avoid such an arithmetic overflow, it is conceivable to multiply the input yd(t) by a constant gain in advance to reduce the amplitude of yd(t). However, in such a method, in the fixed-point arithmetic, the resolution associated with the quantization that has been originally provided by yd(t) is lost (rough quantization makes the vibration waveform not smooth, etc.), and the essential problem cannot be solved.

The fact that x(t−1) has a risk of the arithmetic overflow means that x(t) also has a risk of the arithmetic overflow.

In the calculation of $\sigma_x^2$ in Expression (3), the square of x(t) is required to update $\sigma_x^2$, and it is necessary to add the squared x(t) sequentially. Therefore, in the operation of Expression (3), there is a problem that the risk of occurrence of the arithmetic overflow is extremely high, and due to this risk, the sequential update of the ANF 41 in Expressions (1) to (3) is very likely to fail.

In Expression (2), x(t−1), which tends to increase significantly in the low frequency range, is divided by $\sigma_x^2$, which also tends to increase significantly, and the amount of update does not increase significantly. This is because the ANF 41 in Expressions (1) to (3) includes the normalization process based on Expression (3).

aL means the notch frequency of the ANF in Expression (1), and also a given a unit which means the notch frequency in [Hz] is given in relation to Expression (4).

That is, a is a non-linear map by a cosine function of aL, and a range of a is [−1, 1]. When the notch frequency aL is low, a becomes a value close to −1 due to the non-linearity of the cosine function, and the amount of change of aL per unit hertz becomes smaller as the frequency becomes lower. This means that when estimating the frequency of the vibration component yd using Expression (2), as the frequency of the vibration component yd is lower, the amount of update (second term on the right side) per unit hertz must be minute. The ANF 41 in Expressions (1) to (3) includes the normalization process, and the amount of update is independent of the amplitude A of the vibration component yd, but depends on αx as shown in Expression (8), and in order to reduce the amount of update of Expression (8), a small value needs to be selected for an update step adjustment coefficient μ.

In order to solve the above-mentioned overflow problem of the ANF 41 in Expressions (1) to (3), the present invention proposes the automatic adjustment device 12 shown in FIG. 1.

The update of aL in the automatic adjustment device 12 is based on the following expression.

[Expression 9]

$$a_L(t+1) = a_L(t) - \mu_p \cdot L(|e(t)|) \cdot \text{sign}(e(t) \cdot x(t-1)) \quad (9)$$

Note that μp is an update step adjustment coefficient in the automatic adjustment device 12, sign(·) is a sign function, and L(·) is a limiter function as shown in the following expression.

[Expression 10]

$$L(x) = \begin{cases} U_p, & x > U_p \\ x, & -U_d \leq x \leq U_p, \; U_p > 0, \; U_d > 0 \\ -U_d, & x < -U_d \end{cases} \quad (10)$$

However, Up and Ud are an upper limit of a limiter and a lower limit of the limiter, respectively. For the sake of simplicity, Ud=Up is assumed.

In Expression (9), sign(e(t)·x(t−1)) is used to obtain information on an update direction of aL, and L(|e(t)|) is used to obtain a gain of the amount of update based on the amplitude of e(t).

Since Expression (9) does not require the calculation of $\sigma_x^2$ in Expression (3), Expression (9) can avoid the problem of occurrence of the arithmetic overflow by $\sigma_x^2$. Therefore, if Expression (9) can avoid only the arithmetic overflow in the calculation of x(t−1), the problem of the arithmetic overflow can be solved for the sequential update of aL. To avoid the occurrence of the arithmetic overflow of x(t−1), one solution is to increase the number of bits used for fixed-point arithmetic.

The reason why $\sigma_x^2$ is not included in Expression (9) is that the amplitude information of e(t) and x(t−1) is truncated by setting sign (e(t)·x(t−1)). The normalization process by $\sigma_x^2$ makes the amount of update of aL independent of the magnitude of the amplitude of the vibration component. Similarly, in sign (e(t)·x(t−1)), the amount of update of aL can be made independent of the magnitude of the amplitude of the vibration component.

One of the advantages of the normalization process using $\sigma_x^2$ has been that, as shown in FIG. 6, αx increases around the true value fd, the amount of update becomes small, and the convergence due to sequential update stabilizes. In order to obtain this advantage in a pseudo manner, L(|e(t)|) is adopted in Expression (9).

As shown by the frequency characteristics of Ez in FIG. 5, when the notch frequency a [Hz] is far from the frequency of the vibration component yd, the amplitude of e(t) is almost the same as that of the vibration component yd, but when the notch frequency a [Hz] is close to the frequency of the vibration component yd, the amplitude of e(t) has the property of becoming smaller. That is, the amplitude of e(t) has the property of becoming smaller around the true value fd, so that the amplitude of e(t) can be expected to perform the work similar to that of αx in the normalization process.

In addition, L(|e(t)|) reduces the dependence of the amplitude of the vibration component on the magnitude of the amplitude and facilitates the design of μp. An allowed upper limit of the amplitude of the vibration component yd varies depending on the application. However, for example, in a motor control, the unit of yd is [rpm], and if the upper limit is 100 [rpm], an allowable range of aL is [−1,1], and the amount of update must be fine in the low range. Due to this constraint, if a limiter function L(|e(t)|) is not used in Expression (9) but simply |e(t)| is used, μp must be set small to match the allowable upper limit of e(t) (100 [rpm] in this example). In this case, an update speed will be sacrificed. If μp is set large to speed up convergence, when |e(t)| is large, the sequential update of aL becomes vibrating, and the estimation does not work.

A trade-off problem related to the setting of μp is solved by using the limiter function L(·) in Expression (9). That is, with L(·) applied to |e(t)| to restrict the magnitude of |e(t)|, μp can be designed according to the upper and lower limits Up and Ud of the limiter, and the problem that the sequential update becomes vibrating, which may occur when |e(t)| is large can be solved while maintaining the update speed.

In Expression (9), the second term on the right side, which means the amount of update, can be transformed as follows.

[Expression 11]

$$\begin{aligned} \mu_p \cdot L(|e(t)|) \cdot \text{sign}(e(t) \cdot x(t-1)) &= \mu_p \cdot L(|e(t)|) \cdot \\ &= \text{sign}(e(t)) \cdot \text{sign}(x(t-1)) \\ &= \mu_p \cdot L(e(t)) \cdot \text{sign}(x(t-1)) \end{aligned} \quad (11)$$

Therefore, the automatic adjustment device 12 shown in FIG. 1 is simple as expressed by the following Expressions (12) to (14).

<Adaptive Update Unit 7>

[Expression 12]

$$a_L(t+1) = a_L(t) - \mu_p \cdot e_L(t) \cdot x_s(t-1) \quad (12)$$

<Encoding Unit 8>

[Expression 13]

$$x_s(t-1) \equiv \text{sign}(x(t-1)) \quad (13)$$

<Limiter Unit 9>

[Expression 14]

$$e_L(t) \equiv L(e(t)) \quad (14)$$

A notch filter unit 6 and a unit conversion unit 10 are designed to process Expressions (1) and (4), and a vibration extraction unit 5 may be, for example, configured by an HPF. The vibration extraction unit 5 aims at the removal of a sensor noise at the same time, and may be configured by a BPF.

In the present invention, the limiter unit is expressed by the simplest Expression (14), but units other than that shown in Expression (14) may be used to extract information on the amplitude and sign of e(t).

Figure 9:
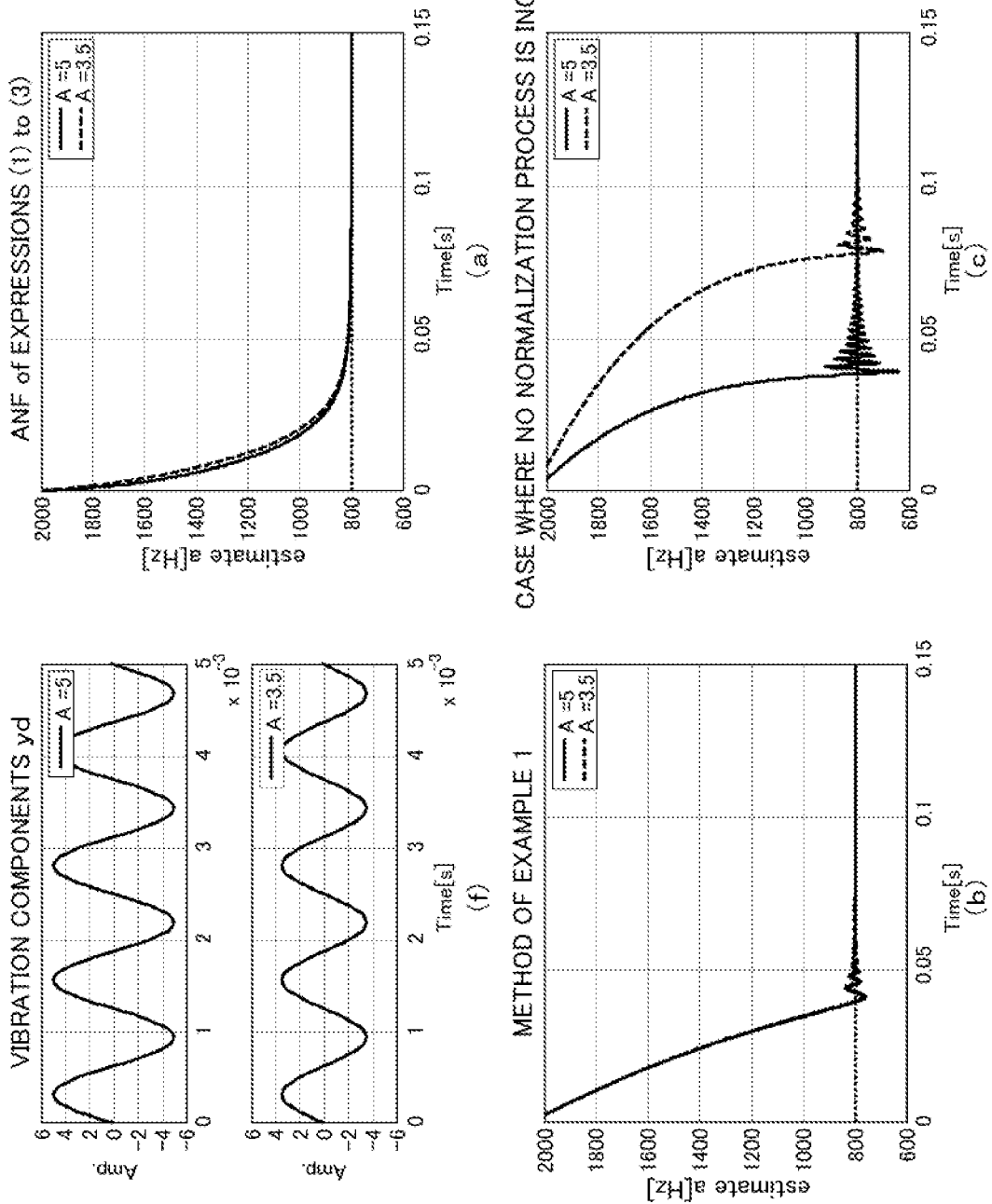
FIG. 9 are diagrams showing the states of updating in Example 1.

The effectiveness of Expressions (9) (equivalently, Expressions (12) to (14)) of the automatic adjustment device 12 according to this example is shown in FIGS. 9 and 10. FIGS. 9 and 10 show convergence statuses of a[Hz] by the sequential update in the cases of (a) Expressions (1) to (3), (b) Expression (9), and (c) Expressions (1) to (3) where the normalization process is excluded (that is, always $\sigma_x^2=1$). The vibration component yd is the convergence statuses of a [Hz] when the noise v=0 and the amplitude A is 3.5 and 5.0. The true value fd was set to 800 [Hz].

FIG. 9(f) shows the two types of vibration components yd used, and FIG. 9(a), FIG. 9(b), and FIG. 9(c) show the convergence statuses of a [Hz] in the case of Expressions (1) to (3) in FIG. 9(a), in the case of Expression (9) in FIG. 9(b), and in the case of Expressions (1) to (3) in FIG. 9(c) with the exclusion of the normalization process, respectively. In (a) and (b), it can be understood that a convergence speed is kept substantially constant regardless of the amplitude of the vibration component yd. The reason why FIG. 9(b) can obtain such a result is because the speed is maintained with μp*L(|e(t)|), and the dependence on the amplitude of the vibration component is eliminated by L(|e(t)|)·sign(e(t)·x(t−1)).

Figure 10A:
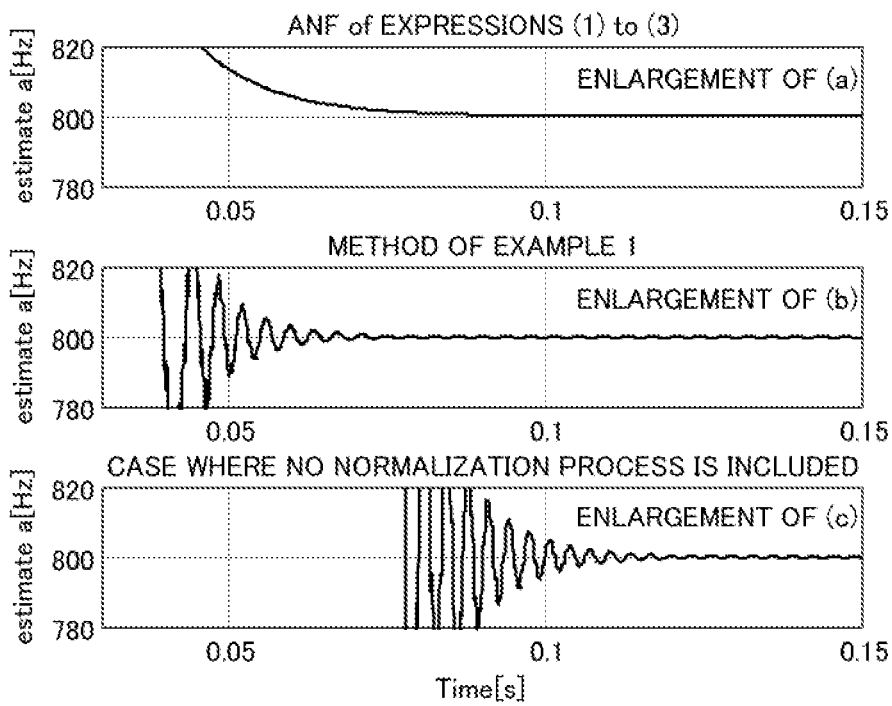
FIGS. 10A and 10B are enlarged views of FIG. 9.
Figure 10B:
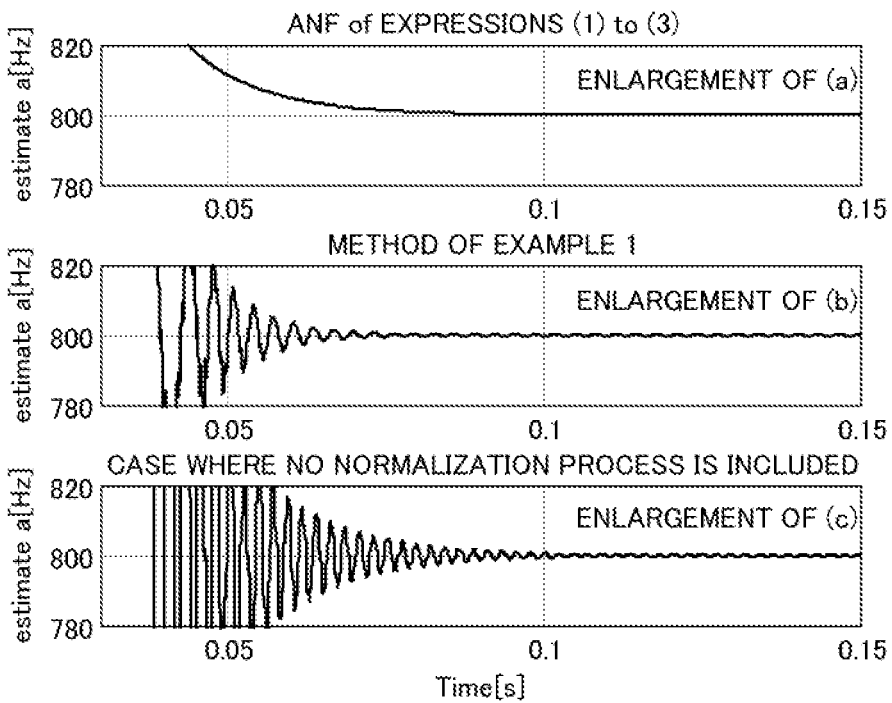

FIG. 10 are enlargement of FIG. 9. FIGS. 10A and 10B are the results of FIG. 9(a) to FIG. 9(c) when the amplitude A=3.5, and the results of (a) to (c) when the amplitude A=5.0, respectively. It is found from FIG. 10 that in (a), a converges smoothly due to the effect of the normalization process, but in (c), the normalization process is not included so that a becomes vibrating at the time of convergence. In addition, it is found that in (b), the vibration phenomenon at the time of convergence is reduced because L(|e(t)|) acts like ax in the normalization process.

One of the advantages of the normalization process by $\sigma_x^2$ was that the LPF(λ) was included, and the sequential update was smooth, and the convergence was stable.

Expression (9) does not include the LPF(λ) and does not have the superiority brought by the LPF(λ). Therefore, for example, aL caused by sequential update does not become smooth due to the influence of the noise v(t) or the like, and convergence may not be stable. Such a phenomenon tends to occur when the vibration component yd is not given by a single sine wave as shown in Expression (5) (where v(t)=0).

In addition, as can be applied to the ANF in general, there is a need to provide a unit for determining whether or not the estimated value aL gradually approaches the true value fd by the sequential update and the estimation has been completed.

To cope with the above problem, in the present invention, a convergence determination unit 11 is provided.

Figure 8:
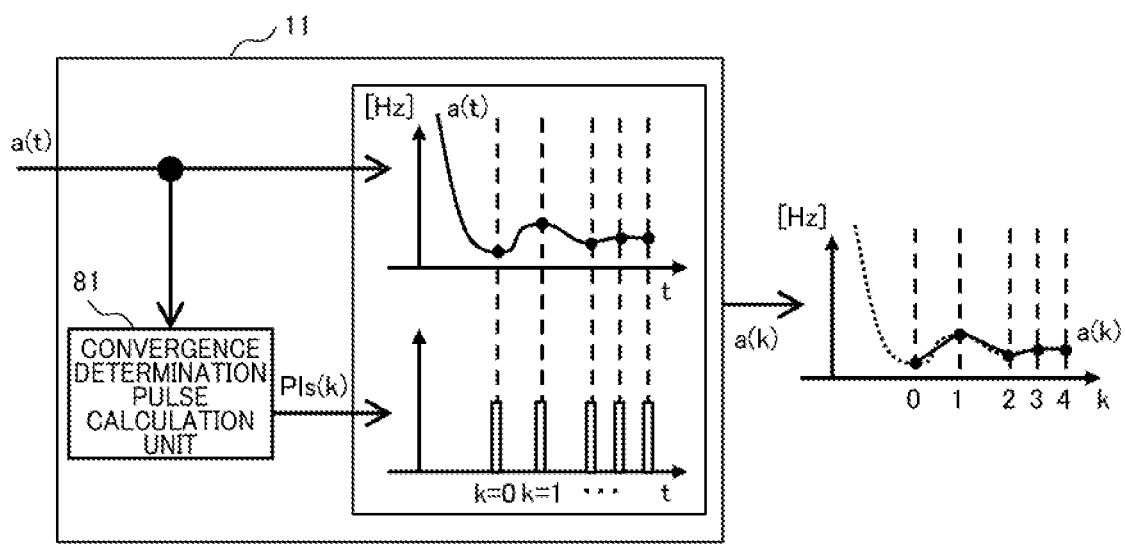
FIG. 8 is a diagram showing a convergence determination unit.

Various implementation methods can be considered for the convergence determination unit 11, but an example of a simple configuration is shown in FIG. 8 and the following description.

<Convergence Determination Unit 11>

A difference process is defined by the following expression.

[Expression 15]

$$\varepsilon(t) \equiv |a(t) - a(t-1)| \quad (15)$$

A convergence determination pulse calculation unit 81 calculates a convergence determination pulse Pls(k) based on the Expression (15) with the following logic.

(i) When a difference process ε(t) never exceeds a difference threshold Tε within a specified time Te, and an absolute value of a difference (slope) between a first value and a last value of a(t) within the specified time Te falls within a slope threshold Tεd, it is determined that the estimated value has converged, and a timing of convergence is set to t=k, and the convergence determination pulse Pls(k) is set to 1.

(ii) The convergence determination pulse Pls(t) is set to 0 until the difference process ε(t) exceeds the difference threshold Tε even once within the specified time Te, or a specified time Ted elapses after the convergence determination pulse occurs.

Finally, as shown in FIG. 8, the convergence determination unit 11 determines that the reliable estimated value of a(t) has been obtained at the timing t=k such that the convergence determination pulse Pls(k)=1 is met with respect to a(t), and outputs an estimated value series a(k). Therefore, if the convergence determination pulse does not occur, a(k) is not output, and the automatic adjustment device 12 does not adjust the FB controller 2.

With the provision of the simple slope calculation method and the slope threshold, a case where a(t) continues to always change minutely with the same sign (that is, a case of the process of reaching convergence) is not determined as convergence. Since a change (slope) of a(t) at the specified time Te is used for the evaluation of the convergence determination, even if a(t) does not change smoothly and is slightly vibrational, and if the change (slope) of a(t) at the specified time Te is small, a device that can make a convergence determination is included.

As a result, even if Expression (9) does not include the LPF(λ) and aL caused by the sequential update is not smooth, the automatic adjustment device 12 can output the highly reliable estimated value a(k) with appropriate timing, and the convergence determination unit 11 plays the role of a recovery for the disadvantages that Expression (9) does not include the LPF(λ).

In addition, the convergence determination unit 11 has the following advantages.

If the vibration component yd is a single sine wave, when aL converges to the frequency fd of the vibration component, e(t)=0 is met so that whether or not aL gradually approaches and converges to the frequency fd of the vibration component can be determined by the magnitude of the amplitude of the output e(t) of the notch filter unit 6.

However, when the vibration component yd contains the noise v(t) as shown in Expression (5) and the variance $\sigma_x^2$ is large, even if a=fd is met, the amplitude of e(t) remains remarkably, and it is not easy to determine the completion of convergence based on the magnitude of the amplitude of e(t).

Furthermore, when dealing with a vibration waveform in which multiple sine waves are superimposed on each other, even if a=fd is met, other sine wave components are output to e(t), and the amplitude of e(t) remains remarkable. In this case as well, it is not easy to determine the completion of convergence based on the magnitude of the amplitude of e(t).

The number of sine waves superimposed depends on the characteristics of the machine 4 to be controlled, and the number of sine waves superimposed is unknown unless the characteristics of the machine 4 to be controlled are investigated in advance. Even with this fact in mind, the determination of the convergence completion based on e(t) is not a desirable approach.

On the other hand, the convergence determination unit 11 is excellent in that even if the vibration component yd contains noise and the multiple sine wave components are superimposed on each other, if aL of the notch filter unit 6 converges, the convergence of aL can be correctly determined. The convergence determination unit 11 is a superior unit in the automatic adjustment device 12 of the motor control system in which the machine 4 to be controlled as shown in FIG. 1 is driven by the FB controller 2.

Furthermore, the actual vibration waveform is not an ideal sine wave with a constant amplitude but the vibration waveform is an approximate sine wave, and the amplitude attenuates. When the ANF of Expressions (1) to (3) or the automatic adjustment device 12 of this example (with Expression (9)) is applied to the above waveform, and there is no guarantee that the convergence of aL in the sequential update is stable as shown in FIGS. 9 and 10. In such a practical case, the convergence determination unit 11 is useful, and even if the convergence of aL in the sequential update is slightly vibrational or occasionally vibrational, the convergence determination unit 11 can extract a at the timing that has converged for a certain period of time as a reliable estimated value. From this point of view, the automatic adjustment device 12 provided with the convergence determination unit 11 is a superior unit in the automatic adjustment device 12 of the motor control system that drives the machine 4 to be controlled with the FB controller 2 as shown in FIG. 1.

The automatic adjustment device 12 including a notch filter unit 6, an adaptive updating unit 7, an encoding unit 8, a limiter unit 9, the convergence determination unit 11, and so on can be realized by allowing a CPU to load a predetermined program on a memory, and allowing the CPU to execute a predetermined program loaded on the memory.

Figure 11:
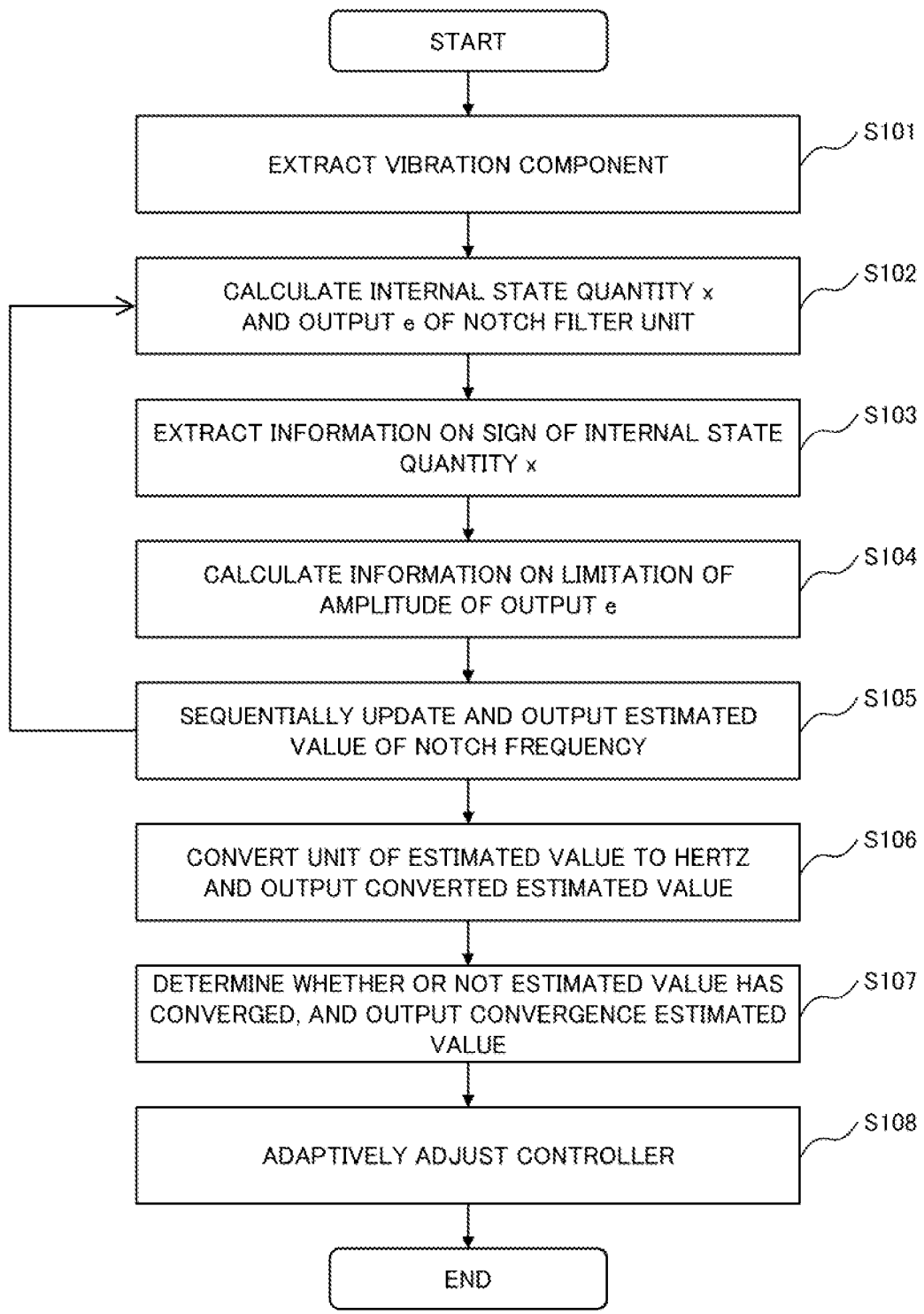
FIG. 11 is an operation flow diagram of automatic adjustment in the motor control device according to Example 1.

FIG. 11 shows an operation flow of the automatic adjustment of the automatic adjustment device according to Example 1.

In S101, the vibration component is extracted from the response of the motor control system by the vibration extraction unit 5.

In S102, the vibration component is input to the notch filter unit 6 and an internal state quantity x and an output e of the notch filter unit 6 are calculated.

In S103, only the information on the sign of the internal state quantity x is extracted and output by the encoding unit 8.

In S104, the information on the limitation of the amplitude of the output e is calculated and output by the limiter unit 9.

In S105, the adaptive updating unit 7 sequentially updates and outputs the estimated value of the notch frequency, which is the filter parameter of the notch filter unit 6, based on a product of the output of the encoding unit 8 and the output of the limiter unit 9. The notch filter unit 6 sequentially uses the estimated value of the notch frequency as the notch frequency. Then, S102 to S105 are repeated.

In S106, the unit of the estimated value sequentially output by the adaptive updating unit 7 is converted to hertz, and output as the estimated value a by the unit conversion unit 10.

In S107, it is determined whether the estimated value a has converged based on the estimated value a converted to hertz, and the convergence estimated value at the time of convergence determination is output by the convergence determination unit 11.

In S108, the automatic adjustment device 12 adaptively adjusts the controller 2 included in the motor control system using the convergence estimated value.

According to the technique of this example described above, there can be provided a motor control device that is capable of performing sequential update and estimation without depending on the magnitude of an amplitude of a vibration component, with stability and high reliability, and without any risk of arithmetic overflow even in an inexpensive arithmetic device that performs fixed-point arithmetic for an estimated value of a frequency of the vibration component, which is required to automatically adjust a controller for suppressing a resonance characteristic of a machine, and an automatic adjusting method for the motor control device.

The notch filter unit 6 may be a Direct Form shown in the following expression in addition to the Lattice Form described in the Expression (1).

[Expression 16]

$$\begin{bmatrix} x(t-1) \\ x(t) \end{bmatrix} = \begin{bmatrix} 0 & 1 \\ -r_D^2 & -a_L(t) \cdot r_D \end{bmatrix} \begin{bmatrix} x(t-2) \\ x(t-1) \end{bmatrix} + \begin{bmatrix} 0 \\ 1 \end{bmatrix} y_d(t) \quad (16)$$

$$e(t) = (1-r_D)[(1+r_D) \quad a_D(t)] \begin{bmatrix} x(t-2) \\ x(t-1) \end{bmatrix} + y_d(t)$$

However, aD and rD are a notch frequency and a notch width of the notch filter of Expression (16), respectively, and aL is used as aD=2×aL from the adaptive updating unit 7.

The automatic adjustment device 12 may be provided with a vibration detection unit that has a mechanism to detect the presence or absence of vibration from the vibration component yd and drive the automatic adjustment device 12 only when it is determined that there is vibration, at a rear stage of the vibration extraction unit 5.

In addition to the output y, the input of the automatic adjustment device 12 may be the output m of the machine 4 to be controlled.

Further, the input of the automatic adjustment device may be rotation position information of the motor in addition to the rotation speed information of the motor. Also, the input of the automatic adjustment device may be rotation speed information, translation speed information, rotation position information, or translation of a mechanical device connected as a load.

Example 2

FIG. 12 shows a configuration in which an automatic adjustment device 91 of Example 2 is applied to an FB control system of a general motor.

The automatic adjustment device 91 has a configuration in which an update amount adjustment unit 92 is added to the automatic adjustment device 12 shown in Example 1, and the adaptive updating unit 7 is changed to an adaptive updating unit 93.

In Example 1, the update of aL is based on Expression (9) and accompanied by the convergence determination unit 11, so that the superiority of the normalization process brought about by $\sigma_x^2$ is reproduced in another form while avoiding the overflow by $\sigma_x^2$.

However, there is room for improvement in the advantages of the convergence speed and stability of aL brought about by the properties of αx shown in FIG. 6 and the smoothness of fluctuations in the sequential update of aL brought about by the LPF(λ).

The automatic adjustment device 91 in this example is to improve the above situations, and the update amount adjustment unit 92 is added to the automatic adjustment device 12 and the adaptive adjustment unit 7 is changed as follows.

<Adaptive Updating Unit 93>

[Expression 17]

$$a_L(t+1) = a_L(t) - \mu_p(t) \cdot e_L(t) \cdot x_s(t-1) \quad (17)$$

Specifically, μp is only changed to μp(t).

The update amount adjustment unit 92 sequentially calculates an update step adjustment coefficient pp(t) based on e(t) and x(t−1). Specifically, the update amount adjustment unit 92 calculates μp(t) so that μp(t) becomes as follows.

<Update Amount Adjustment Unit 92>

[Expression 18]

$$\mu_p(t) = \begin{cases} \mu_L, & E_L < |a - f_d| \\ \mu_M, & E_S < |a - f_d| \le E_L, \\ \mu_S, & |a - f_d| \le E_S \end{cases} \quad \begin{array}{c} 0 < \mu_S < \mu_M < \mu_L \\ 0 < E_S < E_L \end{array} \quad (18)$$

μp(t)=μM is set to a standard value of an update step, and ES and μS are set to small values, so that the amount of update around a true value fd can be reduced by μs. As a result, as the stability of convergence of aL around the true value increases and the sequential update of aL becomes smoother, and the convergence determination unit 11 is likely to make a convergence determination. Also, when a is far from the true value fd, Mp(t)=μL>μM is met, and the amount of update is increased so that the convergence of aL can be accelerated. As a result, with the use of the update amount adjustment unit 92 and the adaptive updating unit 93, the automatic adjustment device 91 according to this example can accelerate the convergence of aL and improve the stability of the convergence of aL around the true value, which is similar to the superiority of the normalization process shown in FIG. 6.

According to the technique of this example, there can be provided a motor control device that is capable of performing sequential update and estimation without depending on the magnitude of an amplitude of a vibration component, with more stability and higher reliability, and without any risk of arithmetic overflow even in an inexpensive arithmetic device that performs fixed-point arithmetic for an estimated value of a frequency of the vibration component, which is required to automatically adjust a controller for suppressing a resonance characteristic of a machine, and an automatic adjusting method for the motor control device.

In the update amount adjustment unit 92 of Expression (18), μp(t) is set as a three-value variable of μS, μM, and μL, but may be realized by two values excluding μL, for example. Furthermore, μM may be further divided into three or more values. In any case, the update amount adjustment unit 92 can calculate μp(t) based on e(t) and x(t−1), depending on the situation of |a−fd|.

Example 3

A motor control device according to Example 3 is intended to be applied to a speed control system in a cascade FB control system of an AC servo motor.

Figure 13:
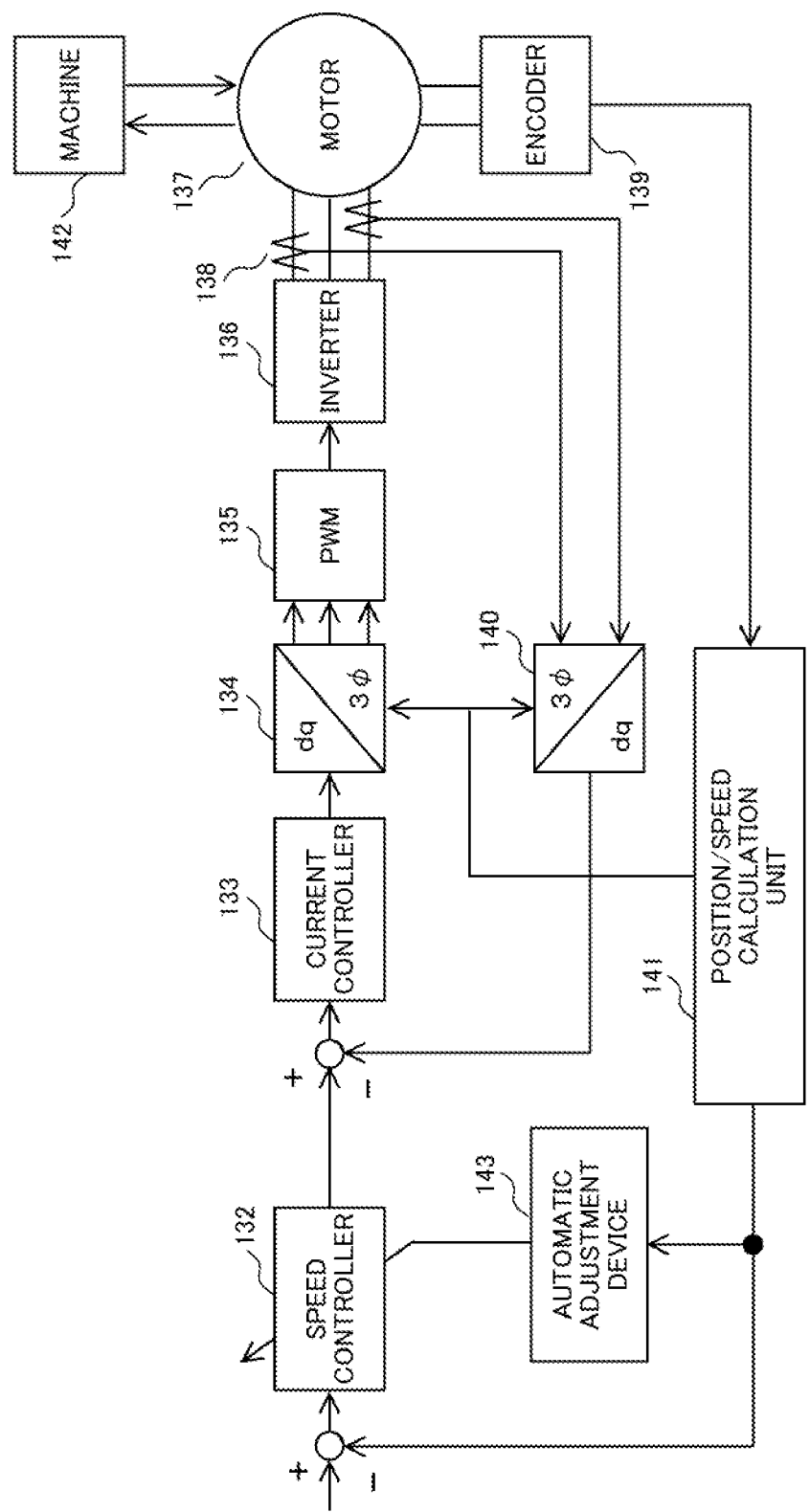
FIG. 13 is a diagram showing an example of a motor control device according to Example 3.
Figure 14:
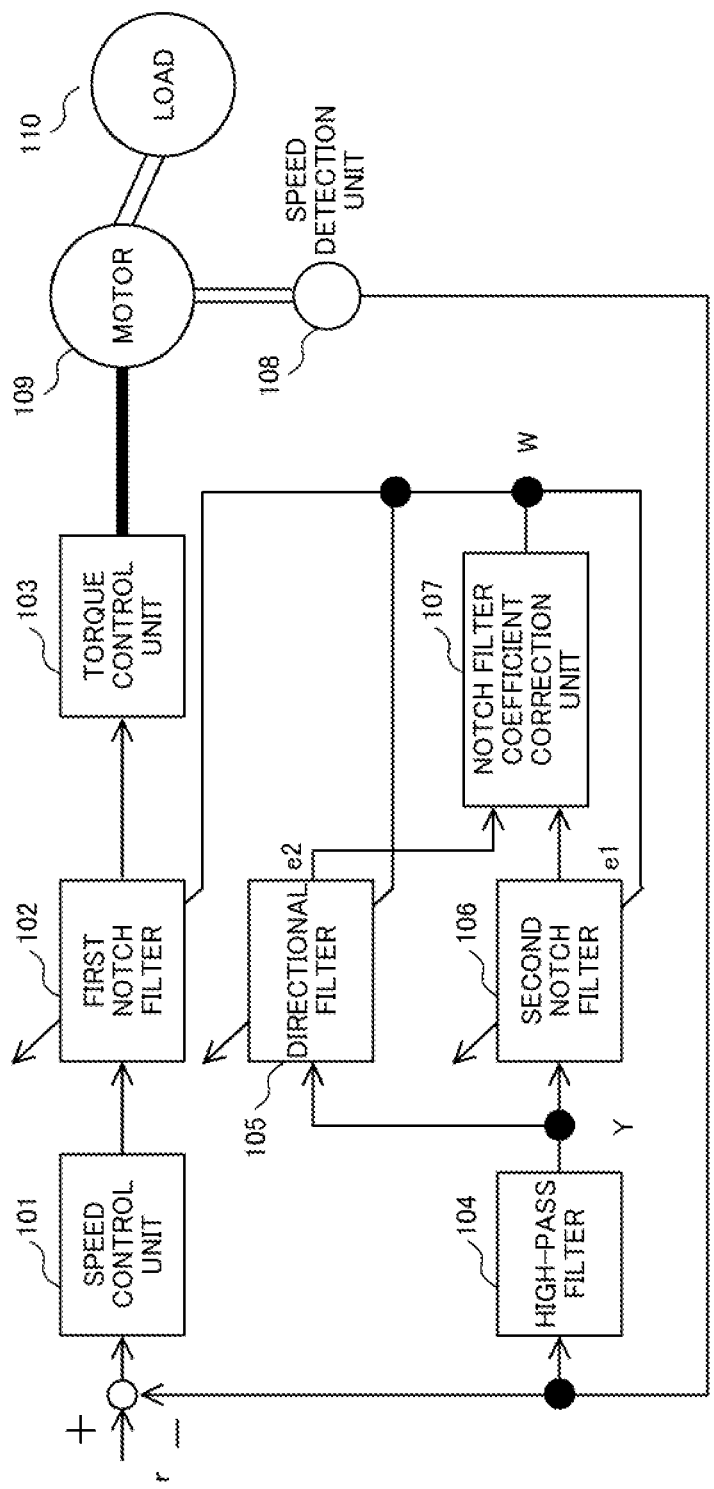
FIG. 14 is a diagram showing a control device for a motor disclosed in PTL 1.

FIG. 13 shows a motor control device in which the automatic adjustment device 12 shown in FIG. 1 is applied to the cascade FB control system of the AC servomotor. However, a speed controller 132 includes a unit that suppresses the vibration of a motor speed (motor rotation speed), and an automatic adjustment device 143 is applied to a speed control system so as to adjust the speed controller 132. The configuration of the speed controller 132 in this case is shown in FIG. 2.

The automatic adjustment device 143 treats a motor speed (motor rotation speed) calculated by a position/speed calculation unit 141 from the output of an encoder 139 as an input.

Assuming that an electric circuit part of the motor is controlled by a current controller 133 and a control cycle is faster than the speed controller 132, the current control system is regarded as approximately 1 (the amount of operation of the speed controller is directly reached to a mechanical part (rotor) of the motor). Therefore, a control target of the speed controller 132 that receives the output of the automatic adjustment device 143 is a mechanical part (rotor) of the motor and a machine 142 connected to the motor rotor, which corresponds to the control target of the FB controller in FIG. 1.

If an inertial number of the machine 142 is 1, and the machine 142 and the motor rotor are considered to be elastically coupled to each other, the control target can be regarded as a two-inertial system in which the machine 142 and the motor rotor are coupled to each other by a spring damper. The control target has frequency characteristics including a set of resonance and anti-resonance characteristics.

Also, if the inertial number of the machine 142 is 2 and each inertia is coupled to each other by a spring damper, and one inertia is considered to be elastically coupled to the motor rotor, the control target can be regarded as a three-inertial system in which each inertia is coupled to each other by the spring damper, and has frequency characteristics including two sets of resonance and anti-resonance characteristics.

The automatic adjustment device 12 shown in Example 1 can be applied regardless of the inertial number of the machine 142 to be controlled. A case where there are multiple vibration components superimposed on the motor rotation speed detected by the position/speed calculation unit 141 due to the inertial number of the machine 142 to be controlled is conceivable. If multiple vibration components are superimposed on each other, the estimation accuracy of the automatic adjustment device 12 may not be excellent. However, even if the number of inertias of the machine 142 to be controlled is large, not all inertias contribute to the generation of vibrations, and vibrations caused by each inertia do not always occur at the same time and the vibration components are not always superimposed on each other, and it is assumed that the vibration components occur individually. In such a case, it can be expected that the automatic adjustment device 143 can sufficiently estimate the vibration components.

Therefore, also in this example, for the speed control system in the cascade FB control system of the AC servomotor, there can be provided a motor control device having the automatic adjustment device 143, which is capable of performing sequential update and estimation without depending on the magnitude of an amplitude of a vibration component, with stability and high reliability, and without any risk of arithmetic overflow even in an inexpensive arithmetic device that performs fixed-point arithmetic for an estimated value of a frequency of the vibration component, which is required to automatically adjust the speed controller 132 having a controller for suppressing a resonance characteristic of a machine.

REFERENCE SIGNS LIST

2 . . . FB controller, 3 . . . motor, 4 . . . machine to be controlled, 5 . . . vibration extraction unit, 6 . . . notch filter unit, 7 . . . adaptive updating unit, 8 . . . encoding unit, 9 . . . limiter unit, 10 . . . unit conversion unit, 11 . . . convergence determination unit, 12 . . . automatic adjustment device, 21 . . . FB controller, 22 . . . control unit, 23 . . . real notch filter, 31 . . . automatic adjustment device, 32 . . . high-pass filter, 33 . . . adaptive notch filter, 41 . . . adaptive notch filter, 42 . . . discrete IIR type notch filter, 43 . . . adaptive adjustment unit, 81 . . . convergence determination pulse calculation unit, 91 . . . automatic adjustment device, 92 . . . update amount adjustment unit, 93 . . . adaptive updating unit, 132 . . . speed controller, 133 . . . current controller, 135 . . . PWM, 136 . . . inverter, 137 . . . AC servo motor, 138 . . . current detection sensor, 139 . . . encoder, 141 . . . position/speed calculation unit, 142 . . . machine to be controlled, and 143 . . . automatic adjustment device.

The invention claimed is:

1. A motor control device including an automatic adjustment device that adaptively adjusts a controller included in a motor control system based on a frequency of a vibration component superimposed on a response of the motor control system, the automatic adjustment device comprising:
a vibration extraction unit that receives the response of the motor control system and extracts the vibration component from the response of the motor control system;
a notch filter unit that receives the vibration component extracted by the vibration extraction unit;
an encoding unit that receives an internal state quantity of the notch filter unit calculated by the notch filter unit;
a limiter unit that receives an output of the notch filter unit calculated by the notch filter unit;
an adaptive updating unit that receives an output of the encoding unit and an output of the limiter unit; and
a unit conversion unit that receives an output of the adaptive updating unit,
wherein the encoding unit extracts and outputs only sign information of the internal state quantity, and outputs the sign information,
the limiter unit calculates and outputs information that limits an output amplitude of the notch filter unit,
the adaptive updating unit sequentially updates and outputs an estimated value of a notch frequency, which is a filter parameter of the notch filter unit, based on a product of the output of the encoding unit and the output of the limiter unit,
the notch filter unit sequentially uses the estimated value sequentially calculated and output by the adaptive updating unit as the notch frequency,
the unit conversion unit converts a unit of the estimated value sequentially calculated by the adaptive updating unit into hertz and outputs the converted value as an estimated value, and
the automatic adjustment device adaptively adjusts the controller included in the motor control system by using the estimated value.

2. The motor control device according to claim 1, wherein the automatic adjustment device includes a convergence determination unit that receives an output of the unit conversion unit,
the convergence determination unit determines whether or not the estimated value has converged to a certain level based on the estimated value converted to the hertz, and outputs the convergence estimated value changed to the hertz at the time of the convergence determination, and
the automatic adjustment device adaptively adjusts the controller included in the motor control system by using the convergence estimated value.

3. The motor control device according to claim 2, wherein the controller includes a notch filter A for suppressing vibration at a rear stage of a feedback controller, and
the automatic adjustment device adaptively adjusts the notch filter A by using the convergence estimated value.

4. The motor control device according to claim 1, wherein the automatic adjustment device includes an update amount adjustment unit that receives the internal state quantity and the output,
the update amount adjustment unit sequentially updates a coefficient related to an update width when the adaptive updating unit sequentially updates the estimated value of the notch frequency,
if the estimated value of the notch frequency is close to the frequency of the vibration component, the update amount adjustment unit reduces the coefficient related to the update width,
if the estimated value of the notch frequency is far from the frequency of the vibration component, the update amount adjustment unit increases the coefficient related to the update width, and
the update width can be adjusted when the adaptive updating unit sequentially updates the estimated value of the notch frequency.

5. The motor control device according to claim 2, wherein the convergence determination unit calculates an absolute value of a difference between a previous value and a current value of the estimated value converted into the hertz as a difference process,
the convergence determination unit determines that the estimated value has been converged when the difference process never exceeds a difference threshold within a predetermined time and an absolute value of a difference (slope) between a first value and a last value of the estimated value at the predetermined time falls within a slope threshold, and outputs and updates the convergence estimated value at a timing of the determination, and
the convergence determination unit does not update the convergence estimated value until the difference process exceeds the difference threshold even once within the predetermined time, or a predetermined time elapses after the estimated value is output and updated.

6. The motor control device according to claim 1, wherein the limiter unit outputs an output of the notch filter unit when an output of the notch filter unit is equal to or less than a predetermined upper limit value and equal to or more than a predetermined lower limit value,
the limiter unit outputs the predetermined upper limit value when the output of the notch filter unit is larger than the predetermined upper limit value,
the limiter unit outputs the predetermined lower limit value when the output of the notch filter unit is smaller than the lower limit value,
the encoding unit outputs 1 when the internal state quantity of the notch filter unit is a positive value,
the encoding unit outputs −1 when the internal state quantity of the notch filter unit is a negative value, and
the encoding unit outputs 0 when the internal state quantity of the notch filter unit is 0.

7. The motor control device according to claim 1, wherein the notch filter unit is a discrete IIR type filter having a second order.

8. The motor control device according to claim 1, wherein the automatic adjustment device receives motor rotation speed information or rotation position information controlled by the motor control device.

9. The motor control device according to claim 1, wherein the automatic adjustment device receives rotation speed information, translation speed information, rotation position information, or translation position information of a mechanical device connected as a load to a motor controlled by the motor control device.

10. The motor control device according to claim 1, wherein the motor control device is a cascade feedback control system for an AC servo motor.

11. An automatic adjustment method for a motor control device that adaptively adjusts a controller included in a motor control system based on a frequency of a vibration component superimposed on a response of the motor control system, the automatic adjustment method comprising the steps of:
  extracting a vibration component from the response of the motor control system by the vibration extraction unit;
  inputting the vibration component to the notch filter unit and calculating an internal state quantity and an output of the notch filter unit;
  extracting and outputting only information on a sign of the internal state quantity by an encoding unit;
  calculating and outputting information on limitation of an amplitude of the output by a limiter unit;
  sequentially updating and outputting an estimated value of a notch frequency as a filter parameter of the notch filter unit, based on a product of the output of the encoding unit and the output of the limiter unit, by an adaptive updating unit;
  sequentially using the estimated value of the notch frequency as the notch frequency by the notch filter unit;
  converting the unit of the estimated value sequentially output by the adaptive updating unit into hertz and outputting the converted estimated value as the estimated value, by a unit conversion unit; and
  adaptively adjusting the controller included in the motor control system using the estimated value by the automatic adjustment device.

12. The automatic adjustment method for the motor control device according to claim 11, further comprising the step of:
  determining whether the estimated value has converged based on the estimated value converted into the hertz and outputting the convergent estimated value at the time when it is determined that the estimated value has converged, by a convergence determination unit;
  wherein the automatic adjustment device adaptively adjusts the real notch filter by using the convergence estimated value.

13. The automatic adjustment method for the motor control device according to claim 12,
  wherein the controller includes a notch filter A for suppressing vibration at a rear stage of the feedback control unit, and
  the automatic adjustment device adaptively adjusts the notch filter A by using the convergence estimated value.

14. The automatic adjustment method for the motor control device according to claim 11,
  wherein the update amount adjustment unit reduces a coefficient related to an update width when the estimated value of the notch frequency is close to the frequency of the vibration component,
  the update amount adjustment unit increases the coefficient related to the update width when the estimated value of the notch frequency is far from the frequency of the vibration component, and
  the update width can be adjusted when the adaptive updating unit sequentially updates the estimated value of the notch frequency.

* * * * *